United States Patent
Medasani et al.

(10) Patent No.: US 8,285,655 B1
(45) Date of Patent: Oct. 9, 2012

(54) METHOD FOR OBJECT RECONGNITION USING MULTI-LAYERED SWARM SWEEP ALGORITHMS (75) Inventors: Swarup Medasani, Thousand Oaks, CA (US); Yuri Owechko, Newbury Park, CA (US)

(73) Assignee: HRL Laboratories, LLC, Malibu, CA (US)

( * ) Notice: Subject to any disclaimer, the term of this patent is extended or adjusted under 35 U.S.C. 154(b) by 549 days.

(21) Appl. No.: 12/587,925

(22) Filed: Oct. 13, 2009

Related U.S. Application Data (63) Continuation-in-part of application No. 10/918,336, filed on Aug. 14, 2004, now Pat. No. 7,636,700.

(60) Provisional application No. 60/541,557, filed on Feb. 3, 2004.

(51) Int. Cl.
 *G06F 15/18* (2006.01)
(52) U.S. Cl. .......................................................... 706/14
(58) Field of Classification Search ...................... 706/14
 See application file for complete search history.

(56) References Cited

U.S. PATENT DOCUMENTS

| 7,558,762 | B2 | 7/2009 | Owechko et al. |
| 7,672,911 | B2 | 3/2010 | Owechko et al. |

OTHER PUBLICATIONS

Qi Li, Isao Sato and Yutaku Murakami, "Steerable Filter based multiscale registration method for JERS-1 SAR and Aster Images" Geoscience and Remote sensing Symposium, Jul. 2007 [Online] Downloaded Jun. 11, 2012 http://ieeexplore.ieee.org/stamp/stamp.jsp?tp=&arnumber=4422810.*

Kim et al "Real-time foreground-background segmenation using codebook Model" Science Direct Real time Imaging II 2005. [Online] Downloaded May 30, 2012. http://ac.els-cdn.com/S1077201405000057/1-s2.0-S1077201405000057-main.pdf?_tid=99e7bc8d5aba64d10dde451683e28fbe&acdnat=1339439828_5749b718ec242e23c5f60855fba1db9b.*

Tsaid, Du-Ming and Shia-Chi h Lai "Independent Component Analysis-Based Background Subtraction for Indoor Surveillance" IEEE Tranactions on Image processing, vol. 18, No. 1, Jan. 2009. [Online] DOwnloaded May 30, 2012.http://ieeexplore.ieee.org/stamp/stamp.jsp?tp=&arnumber=4682624.*

White, Brandyn and Mubarak Shah "Automatically tuning background subtraction parameters using Particle Swarm Optimization" IEEE ICME 2007 [Online] Downloadd May 30, 2012http://ieeexplore.ieee.org/stamp/stamp.jsp?tp=&arnumber=4285028.*

D. Nister and H. Stewenius, "Scalable recognition with a vocabulary tree," in Proc. CVPR , vol. 5, 2006.

(Continued)

*Primary Examiner* — Ben Rifkin
(74) *Attorney, Agent, or Firm* — Tope-McKay & Associates (57) ABSTRACT

Described is a system for multi-layered object detection which presents a unified way of processing an entire field-of-view (FOV) using cognitive swarms of software agents and classifier cascades by partitioning the FOV into layers and processing the closest layer first. A plurality of software agents operate as a cooperative swarm to search the first layer of the field-of-view to locate an objective function optima according to particle swarm optimization dynamics, wherein the objective function optima corresponds to a location of an object in the image in a layer of the field-of-view. The other layers are then sequentially swept to detect other objects in the FOV. In another aspect, the layers correspond to layers of increasing resolution in a hierarchical image pyramid. By using the cooperative swarm to search the coarser resolution layers first, objects can be detected more rapidly. A method and computer program product are also described.

15 Claims, 5 Drawing Sheets

OTHER PUBLICATIONS

S. Medasani and R. Krishnapuram, "Graph Matching by Relaxation of fuzzy assignments," IEEE Transactions on Fuzzy Systems, 9(1), 173-183, Feb. 2001.

R. Krishnapuram, S. Medasani, S. Jung and Y. Choi, "Content-Based Image Retrieval Based on a Fuzzy Approach," IEEE Transactions on Knowledge and Data Engineering (TKDE), Oct. 2004.

N. Oliver and A. Pentland, "Graphical models for driver behavior recognition in a smart car," Proc. of IV2000.

K. Sato and J.K. Aggarwal, "Temporal spatio-velocity transform and its application to tracking and interaction," CVIU 96(2004), 100-128.

S. Hongeng, R. Nevatia, and F. Bremond, "Video-based event recognition: activity representation and probabilistic recognition methods," CVIU 96(2004), 129-162.

Medioni, I. Cohen, F. Bremond, S. Hongeng, R. Nevatia, "Event detection and analysis from video streams," IEEE PAMI 23(8), 2001, 873-889.

N. Oliver, A. Garg, and E. Horvitz, "Layered representations for learning and inferring office activity from multiple sensory channels," CVIU 96(2004), 163-180.

A. Amir, S. Basu, G. Iyengar, C. Lin, M. Naphade, J.R. Smith, S. Srinivasa, and B. Tseng, "A multi-modal system for retrieval of semantic video events," CVIU 96(2004), 216-236.

R.T. Collins, A. J. Lipton, and T. Kanade, "Introduction to the special section on video surveillance," IEEE-PAMI, 22(8), Aug. 2000.

N. Oliver, B. Rosario, and A. Pentland, "A Bayesian computer vision system for moceling human interactions," IEEE-PAMI, 22(8), Aug. 2000.

J.C. Bezdek, Pattern Recognition with Fuzzy Objective Function Algorithms, Plenum Press, New York, 1981.

M.P. Windham, "Numerical classification of proximity data with assignment measure," Journal of Classification, vol. 2, pp. 157-172, 1985.

S. Gold and A. Rangarajan, "A graduated assignment algorithm for graph matching," IEEE Transaction on Pattern Analysis and Machine Intelligence, vol. 18, pp. 377-387, Apr. 1996.

Z. Zhang, "A flexible new technique for camera calibration," IEEE Transactions on Pattern Analysis and Machine Intelligence, 22(11): 1330-1334, 2000.

Jean-Yves Bouguet, "Camera Calibration Toolbox for Matlab," http://www.vision.caltech.edu/bouguetj/calib_doc/.

Intel OpenCV Computer Vision Library (C++), http://www.intel.com/research/mrl/research/opencv/.

Giorgio Carpaneto, Paolo Toth, "Algorithm 548: Solution of the assignment problem [H]," ACM Transactions on Mathematical Software, 6(1): 104-111, 1980.

I. Hartley, A. Zisserman, "Multiple view geometry in computer vision," Cambridge University Press, Cambridge, UK 2000.

Longuet-Higgins, "A computer algorithm for reconstructing a scene from two projections" Nature, 293: 133-135, Sep. 1981.

T. Kailath, et al., "Linear Estimation," Prentice Hall, NJ, ISBN 0-13-022464-2, 854pp, 2000.

P. Saisan, "Modeling of Pedestrian Motion for recognition," IS&T/SPIE 17th annual symposium, San Jose, CA 2005.

A.R. Dick, et al., "Combining Single view recognition and multiple view stereo for architectural scenes," International Conference on Computer Vision (ICCV'01) vol. 1, Jul. 7-14, 2001, Vancouver, B.C., Canada.

G. Shakhanarovich, et al. "Integrated face and gait recognition from multiple views," In Proceedings of the IEEE Conference on Computer Vision and Pattern Recognition, Dec. 2001, Kauai, Hawaii.

Sujit Kuthirummal, et al., "Planar shape recognition across multiple views," In Proceedings of the Interationa Conference on Pattern Recognition (ICPR)—2002, Quebec, Canada.

Sujit Kuthirummal, et al., "Multiview constraints for recognition of planar curves in fourier domain," Proceedings of the Indian Conference on Vision Graphics and Image Processing (ICVGIP)—2002.

A. Selinger and R.C. Nelson, "Appearance-based object recognition using multiple views," In Proceedings of the IEEE Conference on Computer Vision and Pattern Recognition—Dec. 2001, Kauai, Hawaii.

D.L. Swets, et al., "Genetics Algorithms for Object Recognition in a complex scene," Proc. of Intl. Conference on Image Processing, vol. 2, Oct. pp. 23-26, 1995.

V. Ciesielski and M. Zhang, "Using Genetic Algorithms to Improve the Accuracy of Object Detection," In Proceedings of the third Pacific-Asia Knowledge Discovery and Data Mining Conference, Ning Zhong and Lizhu Zhou (Eds.), Knowledge Discovery and Data Mining—Research and Practical Experiences. Tsinghua University Press, p. 19-24. Beijing, China, Apr. 26-31, 1999.

Kennedy, J., et al., "Swarm intelligence," San Francisco: Morgan Kaufmann Publishers, 2001.

R.C. Eberhart, et al., "Particle swarm optimization: Developments, applications, and resources," Proceedings of IEEE Congress on Evolutionary Computation (CEC 2001), Korea, 2001.

R. Brits, et al., "A Niching Particle Swarm Optimizer," 2002.

F. Rojas, I. Rojas, R. M. Clemente, and C.G. Puntoner, "Nonlinear blind source separation using genetic algorithms," in Proceedings of International Conference on Independent Component Analysis, 2001.

D. Beasley, D. R. Bull, and R. R. Martin, "A Sequential Niching Technique for Multimodal Function Optimization," Evolutionary Computation, 1(2), p. 101-125, 1993.

R. Krishnapuram and J. M. Keller, "Quantitive Analysis of Properties and Spatial Relations of Fuzzy Image Regions," Transactions on Fuzzy Systems, 1(2):98-110, 1993.

Y. Owechko, S. Medasani, and N. Srinivasa, "Classifier Swarms for Human Detection in infrared imagery," Proc. of the CVPR workshop on Object Tracking and Classification Beyond the Visible Spectrum (OTCBVS'04) 2004.

Y. Owechko, et al., "Vision-Based Fusion System for Smart Airbag Applications," Intelligent Vehicle Symposium, 2002. IEEE, Publication Date: Jun. 17-21, 2002, vol. 1, on pp. 245-250 vol. 1.

Y. Owechko and S. Medasani, "A Swarm-based Volition/Attention Framework for Object Recognition," IEEE Conference on Computer Vision and Pattern Recognition, San Diego, Proc. of CVPR-WAPCV 2005.

Y. Owechko and S. Medasani, "Cognitive Swarms for Rapid Detection of Objects and Associations in Visual Imagery," IEEE Swarm Intelligence Symposium, Pasadena, 2005.

P. Saisan, S. Medasani, and Y. Owechko "Multi-View Classifier Swarms for Pedestrian Detection and Tracking," IEEE Conference on Computer Vision and Pattern Recognition, San Diego, 2005.

N. Srinivasa, et al., "Fuzzy edge-symmetry features for enhanced intruder detection," 11th International Conference on Fuzzy Systems, FUZZIEEE 2003.

F. Orabona, G. Metta, and G. Sandini, "Object-based Visual Attention: A Model for a Behaving Robot," in 3rd International Workshop on Attention and Performance in Computational Vision (in CVPR 2005), San Diego, CA, Jun. 2005.

B. J. Scholl, "Objects and Attention: The State of the Art," Cognition 80: 1-46, 2001.

Y. Sun and R. Fisher, "Hierarchical Selectivity for Object-based Visual Attention," submitted to Artificial Intelligence, 2004.

Liao, Wenhul and Ji, Qiang 2006, "Efficient Active Fusion for Decision-making via VOI Approximation," in Proc. AAAI 2006, 1180-1185.

Jaynes, C., Stolle, F., and Collins, R., "Task Driven Perceptual Organization for Extraction of Roofop Polygons," Proceedings of the ARPA Image Understanding Workshop, Monterey, California (Morgan Kaufmann Publishers, San Francisco, 1994), pp. 359-365.

A. Huertas, and R. Nevatia, "Detecting Changes in Aerial Views of Man-Made Structures," IVC200.

R. Mendes, "The Fully Informed Particle Swarm: Simpler, Maybe Better," Special issue of IEEE Trans. on Evol. Computation on Particle Swarm Optimization, vol. 8, No. 3, Jun. 2004.

K.E. Parsopoulos, et al. "On the Computation of All Global Minimizers Through Particle Swarm Optimization," Special issue of IEEE Trans. on Evol. Computation on Particle Swarm Optimization, vol. 8, No. 3, Jun. 2004.

F. van der Bergh, et al., "A Cooperative Approach to Particle Swarm Optimization," Special issue of IEEE Trans. on Evol. Computation on Particle Swarm Optimization, vol. 8, No. 3, Jun. 2004.

A. Ratnaweera, "Self-Organizing hierarchical particle Swarm Optimizer with Time-Varying Acceleration Coefficients," Special issue of IEEE Trans. on Evol. Computation on Particle Swarm Optimization, vol. 8, No. 3, Jun. 2004.

C.A. Coello, "Handling Multiple Objectives With Particle Swarm Optimization," Special issue of IEEE Trans. on Evol. Computation on Particle Swarm Optimization, vol. 8, No. 3, Jun. 2004.

L. Messerschmidt, et al., "Learning to Play Games Using a PSO-Based Competitive Learning Approach," Special issue of IEEE Trans. on Evol. Computation on Particle Swarm Optimization, vol. 8, No. 3, Jun. 2004.

M.P. Wachwiak, et al., "An Approach to Multimodal Biomedical Image Registration Utilizing Particle Swarm Optimization," Special issue of IEEE Trans. on Evol. Computation on Particle Swarm Optimization, vol. 8, No. 3, Jun. 2004.

R. Hassan, B. Cohanim, and O. de Weck, "A Comparison of Particle Swarm Optimization and the Genetic Algorithm," AIAA Conference, 2005.

J.F. Schutte, J.A. Reinbolt, B.J. Fregly, R.T. Haftka, and A.D. George, "Parallel Global Optimization with the Particle Swarm Algorithm," Int. J. Numerical methods in Engineering, 61: 2296-2315, 2004.

J. Kennedy and W.M. Spears, "Matching Algorithms to Problems: An Experimental Test of the Particle Swarm and Some Genetic Algorithms on the Multimodal Problem Generator," Proceedings of IEEE Inter. Conf. on Evolutionary Computation, 78-83, 1998.

Bradski, G. and S. Grossberg (1995), "Fast learning VIEWNET architectures for recognizing 3-D objects from multiple 2-D views," Neural Networks 8, 1053-1080.

Charniak, E. (1991), "Bayesian networks without tears," AI Magazine 12, 50-63.

Hu, W., D. Xie, et al. (2004), "Learning activity patterns using fuzzy self-organizing neural network," IEEE Transactions on Systems, Man, and Cybernetics—Part B: Cybernetics 34, 1618-1626.

Lazebnik, S., C. Schmid, et al. (2006), "Beyond bags of features: Spatial pyramid matching for recognizing natural scene categories," IEEE Conference on Computer Vision and Pattern Recognition, New York, NY.

Lowe, D. (1999), "Object recognition from local scale-invariant features," International Conference on Computer Vision, Corfu, Greece.

Medasani, S. and Y. Owechko (2007), "Behavior recognition using cognitive swarms and fuzzy graphs," SPIE Defense and Security Symposium, Orlando, FL.

S. Medasani, and Y. Owechko, "Possibilistic Particle Swarms for Optimization," Proceedings 5673 of SPIE/IST Symposium on Electronic Imaging, San Jose, 2005.

Park, S. and J. Aggarwal (2003), "A hierarchical Bayesian network for event recognition of human actions and interactions," ACM SIGMM International Workshop on Video Surveillance, Berkely, CA.

Barbara Zitova and Jan Flusser, "Image registration methods: a survey," Image and Vision Computing 21, pp. 977-1000, 2003.

B. Bhanu, et al., "Adaptive Image Segmentation Using a Genetic Algorithm," IEEE Transactions on Systems, Man, and Cybernetics, vol. 25, No. 12, Dec. 1995.

Office action from U.S. Appl. No. 10/918,336.

Khosla, D., Moore, C., and Chelian, S. (2007). A Bioinspired system for spatio-temporal recognition in static and video imagery. Proceedings of SPIE, 6560: 656002.

Judea Pearl, et al., "Bayesian Networks," Handbook of Brain Theory and Neural Networks, Technical Report, R-277, Nov. 2000.

Avrim Blum (1996), "On-Line Algorithms in Machine Learning", in Proceedings of the Workshop on On-Line Algorithms.

Notice of Allowability for U.S. Appl. No. 11/433,159.

Reply to Notice of Allowance for U.S. Appl. No. 11/433,159.

Notice of Allowability for U.S. Appl. No. 10/918,336.

Notice of Allowability for U.S. Appl. No. 11/800,265.

Notice of Allowability for U.S. Appl. No. 11/367,755.

Notice of Allowability for U.S. Appl. No. 11/385,983.

* cited by examiner

METHOD FOR OBJECT RECONGNITION USING MULTI-LAYERED SWARM SWEEP ALGORITHMS

PRIORITY CLAIM

The present application is a Continuation-in-Part Application of U.S. patent Ser. No. 10/918,336, filed Aug. 14, 2004, entitled, "Object Recognition System Incorporating Swarming Domain Classifiers" which claims the benefit of priority of U.S. Provisional Patent Application No. 60,541,557, filed Feb. 3, 2004, entitled, "Object Recognition Using Swarming Image Classifiers."

BACKGROUND OF THE INVENTION (1) Field of Invention

The present invention relates to a system for multi-layered object detection and, more particularly, to a system for multi-layered object detection which utilizes particle swarm optimization and hierarchical representation schemes.

(2) Description of Related Art

In typical object recognition systems, a classifier is used exhaustively either at all potential locations of a scene or at locations cued by other sensors such as radar-based, LIDAR, or stereo sensors. For an exhaustive search case, the objects are processed in the entire field-of-view using the same parameter sets and classifiers. This limitation burdens the system to find the most suitable choice of parameters across the entire field-of-view.

Particle swarm optimization (PSO) is a relatively new optimization method with unique attributes making it especially suitable for feature selection and optimization. An advantage of PSO is the simple and natural way that candidate solutions are represented as points in a separable space. This feature allows almost any feature to be represented and provides great flexibility in specifying regions of the solution space to be explored. Another advantage is PSO's superior performance due to its good balancing of cooperation and competition, which arises from the use of swarm intelligence principles.

PSO is a simple but powerful population-based algorithm that is effective for optimization of a wide range of functions as described by Kennedy et al. in "Swarm Intelligence", San Francisco: Morgan Kaufmann Publishers, 2001, and by Eberhart and Shi in "Particle Swarm Optimization: Developments, Applications, and Resources", 2001, which is incorporated by reference as though fully set forth herein.

PSO models the exploration of a multi-dimensional solution space by a "swarm" of software agents, or particles, where the success of each agent has an influence on the dynamics of other members of the swarm. Each particle in the swarm resides in a multi-dimensional solution space. The positions of the particles represent candidate problem solutions. Additionally, each particle has a velocity vector that allows it to explore the space in search of an objective function optima. Each particle $i$ keeps track of a position vector $\vec{y}_i$ that represents the current best solution the particle has found. Another position vector $\vec{y}_g$ is used to store the current global best solution found by all of the particles. The velocity and position vectors for particle $i$ are then changed probabilistically according to the following set of dynamic update equations:

$$\vec{v}_i(t+1) = w\vec{v}_i(t) + c_1 q_1 [\vec{y}_i(t)] + c_2 q_2 [\vec{y}_g(t) - \vec{x}_i(t)]\vec{x}_i(t+1) =$$
$$\vec{x}_i(t) + X\vec{v}_i(t+1),$$

where $\vec{x}_i(t)$ and $\vec{v}_i(t)$ are the position and velocity vectors at time t of the i-th particle and $c_1$ and $c_2$ are parameters that weight the influence of the "individual best" $\vec{y}$ and "swarm best" $\vec{y}_g$ terms. w is a momentum constant that prevents premature convergence, and x is a constriction factor which also influences the convergence of PSO. $q_1$ and $q_2$ are random variables that allow the particles to better explore the solution space. The described dynamics cause the swarm to concentrate on promising regions of solution space very quickly with sparse sampling of the solution space.

SUMMARY OF THE INVENTION

The present invention relates to a system for multi-layered object detection utilizing particle swarm optimization. The system comprises one or more processors that are configured to perform operations of first partitioning a field-of-view of an image captured by a sensor into a plurality of layers. A plurality of software agents then operate as a cooperative swarm to sequentially search each of the plurality of layers to locate an objective function optima according to particle swarm optimization dynamics, wherein the objective function corresponds to a location of an object of interest in the layer being searched. Finally, an object of interest is extracted from at least one layer for presentation to a user.

In another aspect, the system is configured to perform operations of searching a first layer for the objective function optima corresponding to the location of an object of interest, the first layer being the layer closest to the sensor. Upon detection of an object of interest in the first layer, a region of the image is masked resulting in at least one masked region and at least one unmasked region. The at least one masked region corresponds to a region in the field-of-view of the image behind the object of interest. The system is further configured to search succeeding layers of the field-of-view for an object of interest until the entire field-of-view has been searched for at least one object of interest, wherein the plurality of software agents are distributed in at least one unmasked region of the field-of-view.

In yet another aspect, the system further performs operations of employing a cascade of classifiers at each layer of the field-of-view for object detection, wherein the cascade of classifiers comprises a plurality of classifier stages, and wherein each software agent implements a cascade which classifies a local region in each layer.

In another aspect the cascade of classifiers is employed in a layer-specific manner, such that a distinct set of classifier stages is used for each layer.

In another aspect, the system is further configured to perform operations of selecting a plurality of software agents and a set of parameters for each layer of the field-of-view, wherein each layer provides a context for the selection of the software agents and set of parameters.

In another aspect, the system is further configured to generate an image pyramid of the image, wherein the plurality of layers correspond to a plurality of levels in the image pyramid. The image pyramid comprises a hierarchical structure having a plurality of levels representing distinct image resolutions of the image. The plurality of levels comprise a coarsest level having a coarsest image resolution, a finest level having a finest image resolution, and at least one level between the coarsest level and the finest level. A swarm having relatively fewer software agents is used to search the coarsest level of the image pyramid first to locate at least one region which contains the object of interest. A swarm having a relatively greater number of software agents is used to search levels having increasing image resolutions along the image pyramid in order to locate the object of interest.

As can be appreciated by one in the art, the present invention also comprises a method for causing a processor to perform the operations described herein.

Finally, the present invention also comprises a computer program product comprising computer-readable instruction means stored on a computer-readable medium that are executable by a computer having a processor for causing the processor to perform said operations described herein.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

The present invention relates to a system for multi-layered object detection and, more particularly, to a system for multi-layered object detection which utilizes particle swarm optimization. The following description is presented to enable one of ordinary skill in the art to make and use the invention and to incorporate it in the context of particular applications. Various modifications, as well as a variety of uses, in different applications will be readily apparent to those skilled in the art, and the general principles defined herein may be applied to a wide range of embodiments. Thus, the present invention is not intended to be limited to the embodiments presented, but is to be accorded with the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter-clockwise have been used for convenience purposes only and are not intended to imply any particular fixed direction. Instead, they are used to reflect relative locations and/or directions between various portions of an object. As such, as the present invention is changed, the above labels may change their orientation.

(1) Principal Aspects

The present invention has three "principal" aspects. The first is a system for multi-layered object detection utilizing particle swarm optimization (PSO). The system is typically in the form of a computer system, computer component, or computer network operating software or in the form of a "hard-coded" instruction set. This system may take a variety of forms with a variety of hardware devices and may include computer networks, handheld computing devices, cellular networks, satellite networks, and other communication devices. As can be appreciated by one skilled in the art, this system may be incorporated into a wide variety of devices that provide different functionalities. The second principal aspect is a method for multi-layered object detection utilizing PSO, typically in the form of software, operated using a data processing system (computer or computer network). The third principal aspect is a computer program product. The computer program product generally represents computer-readable instruction means stored on a computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories.

The term "instruction means" as used with respect to this invention generally indicates a set of operations to be performed on a computer, and may represent pieces of a whole program or individual, separable, software modules. Non-limiting examples of "instruction means" include computer program code (source or object code) and "hard-coded" electronics (i.e. computer operations coded into a computer chip). The "instruction means" may be stored in the memory of a computer or on a computer-readable medium such as a floppy disk, a CD-ROM, and a flash drive. These aspects will be described in more detail below.

(2) Specific Details

By using PSO, one can search for objects of interest over multiple dimensions efficiently. The system described herein uses a parsimonious set of software agents, or particles, and parameter sets, which are appropriate for different layers of a field-of-view, to efficiently search for and detect objects of interest using PSO. The present invention presents a unified way of processing an entire field-of-view (FOV) using cognitive swarms of software agents, or particles, and classifier cascades by partitioning the FOV into layers and processing the closest layer first. The other layers are then sequentially swept to detect other objects in the FOV.

Figure 1:
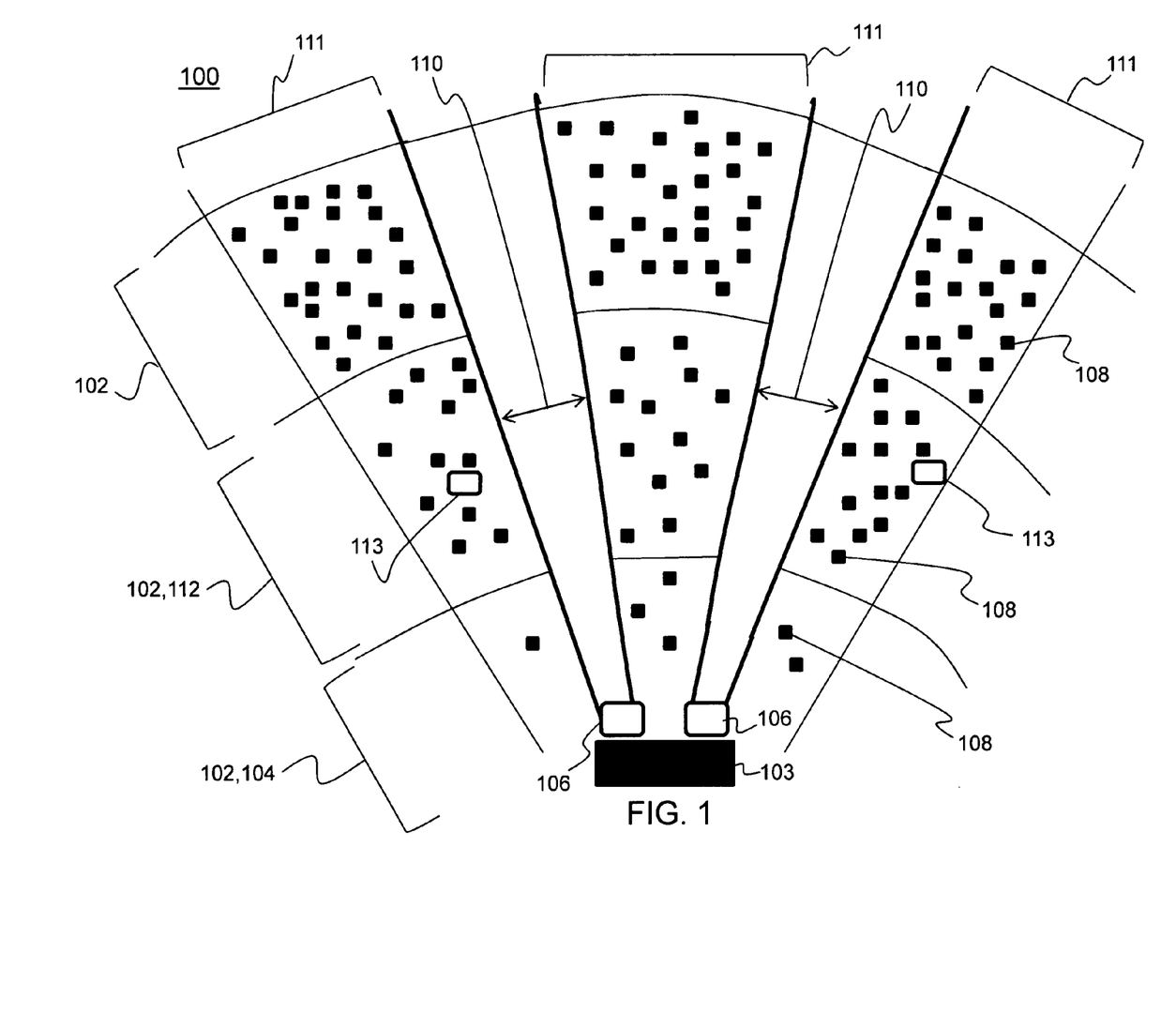
FIG. 1 illustrates a diagram of a multi-layered swarm sweep approach according to the present invention.

FIG. 1 illustrates a multi-layered swarm sweep approach to object detection according to the present invention. The FOV 100 is partitioned into a plurality of layers 102, with each layer 102 representing a depth zone in the FOV 100 of a sensor, non-limiting examples of which include a CCD or CMOS sensor of a camera 103. Layers 102 are intended to refer to zones in the three-dimensional world that vary from close to the camera 103 to very far from the camera 103. When mapped to the camera 103 image, the layers 102 can have different meanings depending on the camera 103 geometry. For instance, for a camera 103 mounted on a vehicle, the three-dimensional layers 102 (or zones) map to bands in the image with the lowest band corresponding to the layer 102 closest to the camera 103 and the highest band corresponding to the layer 102 furthest from the camera 103. For a camera 103 on an aerial platform, each of the three-dimensional layers 102 maps to the entire image.

The number of layers 102 used depends on the performance of a classifier cascade and the requirements, if any, of the system to detect objects closer than a certain range. The layered approach capitalizes on the characteristics of vision-based classifier cascades. For example, a given image is first processed with a large window of pixels and low complexity (and/or relaxed success criteria) for a set of classifiers. Since the first layer 104 includes objects 106 closest to the camera 103 (therefore having the most pixels on target), the classifier cascades perform most reliably. Non-limiting examples of classifiers include neural networks, decision trees, support vector machines, and k-nearest neighbors. Non-limiting examples of features employed by the classifier cascades include Haar or Viola wavelets that capture multi-scale edge information, edge symmetry features that capture edge information at multiple orientations, and histograms of oriented gradients that capture gradient information which is invariant to geometric and photometric transformations.

The specific classifier cascade chosen for detecting objects 106, such as humans, also results in a wide area around the center of the object 106 that has high confidence for the presence of the object 106. This area is referred to as the core of the object 106 and provides support to the presence of the object 106 in that region. The presence of a large core implies that fewer particles 108 are needed to search for the object 106. Furthermore, since there are plenty of pixels on target, all of the stages in the classifier cascade may not be needed to accurately identify the objects. It may be sufficient to just go down one or two stages in the cascade, thus saving computational time and resources. The first layer 104 is then searched for objects 106 using cognitive swarm algorithms, such as particle swarm optimization (PSO) algorithms. For example, if each particle 108 in a swarm is an image classifier, then in the first layer 104, fewer particles 108 are used with lower complexity classifiers and/or relaxed success criteria. The entire image (or FOV 100) is initially processed with the first layer 104 criteria.

Once the objects 106 are detected using the global and local swarms of particles 108, wide swaths 110 of regions that the detected objects 106 occlude behind them are masked out. In other words, the detection of objects 106 results in the corresponding pixels in the image being excluded from processing at the next layer 102. The presence of objects 106 in the closer layers (e.g., first layer 104) thus reduces the search space in outer layers significantly. This object mask 110 delineates the regions where no objects have yet been detected 111 and, hence, where additional objects could possibly be located. The detection of objects 106 results in more pixels being excluded from processing with the next layer's processing parameters.

As described above, the first layer 104 of the FOV 100 includes objects 106 closest to the camera 103, therefore having the most pixels on target. For the second layer 112, objects 113 in the FOV 100 have fewer pixels on target and the core sizes are also smaller. Additionally, there is a good possibility that false alarms are more numerous than in the first layer 104. This characteristic of the second layer 112 suggests the need to use more stages in the classifier cascade than before for increasing classifier accuracy.

In the case of an image with a ground plane, the first layer 104 is associated with pixels closest to the ground plane. Upper layers (e.g., the second layer 112) are associated with pixels further from the ground plane. Given such an image, the lowest set of pixels in the image (closest to the bottom of the image) is processed first with the first layer 104 parameters (e.g., image classifiers). Then, the other layer (e.g., the second layer 112) of pixels is processed, which may or may not involve different numbers of particles 108 with different classifier complexities and/or different classifier success criteria. The pixels of the upper layers (e.g., the second layer 112) which are processed are the pixels remaining after exclusion of the pixels corresponding to objects 106 detected in the processing of the first layer 104.

Furthermore, as shown in FIG. 1, more particles 108 are needed to search the larger area of the second layer 112 compared to the first layer 104 due to smaller core sizes. Increasing numbers of particles 108, each with a smaller window, higher complexity classifiers, and/or more stringent success criteria, are used as the layers 102 move outwards and away from the camera 103. The object mask 110 is used to generate the initial distribution of particles 108 in the unmasked regions 111 where no objects have yet been detected so that they are not wasted on regions where an object 106 has already been detected 110. All of the pixels in the image which were not excluded by the first layer 104 processing are examined. This approach is then continued onto other succeeding layers 102 until the entire FOV 100 has been processed, such that all pixels have been excluded, or some other predetermined criteria. Note that the entire parameter list, global and local swarm thresholds, and other sensitivity parameters can all be contextually adjusted, wherein each layer 102 being processed provides the context. Since the camera 103 geometry is already used in determining the layers 102, there is no need for an explicit heightmap as in previous approaches.

In a desired aspect, there is an extension to the camera FOV where objects enter or exit from the side of the FOV. The present invention can then be executed in layers that start at the sides and sweep inwards to the center of the FOV.

Figure 2:
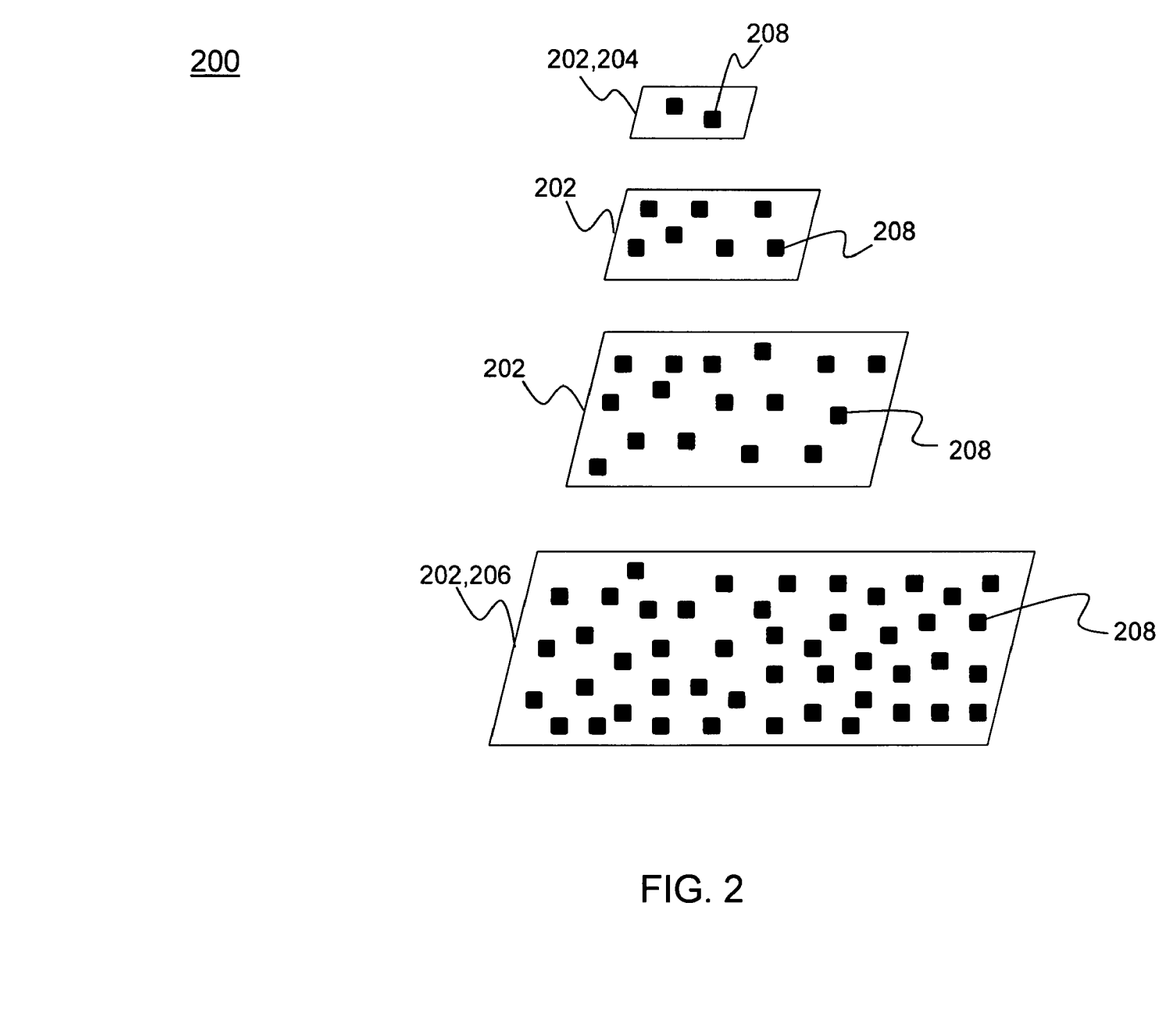
FIG. 2 illustrates an image pyramid where layers in a field-of-view correspond to levels in an image pyramid according to the present invention.

In another desired aspect, the present invention can be applied to the case of image pyramids where layers in a FOV correspond to levels in an image pyramid. An image pyramid is a hierarchical structure comprised of several levels of the same image of different resolutions. FIG. 2 illustrates an image pyramid 200 comprised of a plurality of levels 202. In the present example, the top level 204 corresponds to the coarsest level of the image pyramid 200 (i.e., the level with the lowest resolution), and the bottom level 206 corresponds to the level of the image pyramid 200 with the finest image resolution (i.e., the highest resolution). Swarms with few particles 208 are used to process the top level 204 of the image pyramid 200 and find potential regions that contain objects of interest. Increasing numbers of particles 208 are used to search the levels 202 as they increase in resolution along the image pyramid. In addition, an additional scan to find objects that were undetected from the coarser levels (e.g., top level 204) can also be incorporated.

Figure 3:
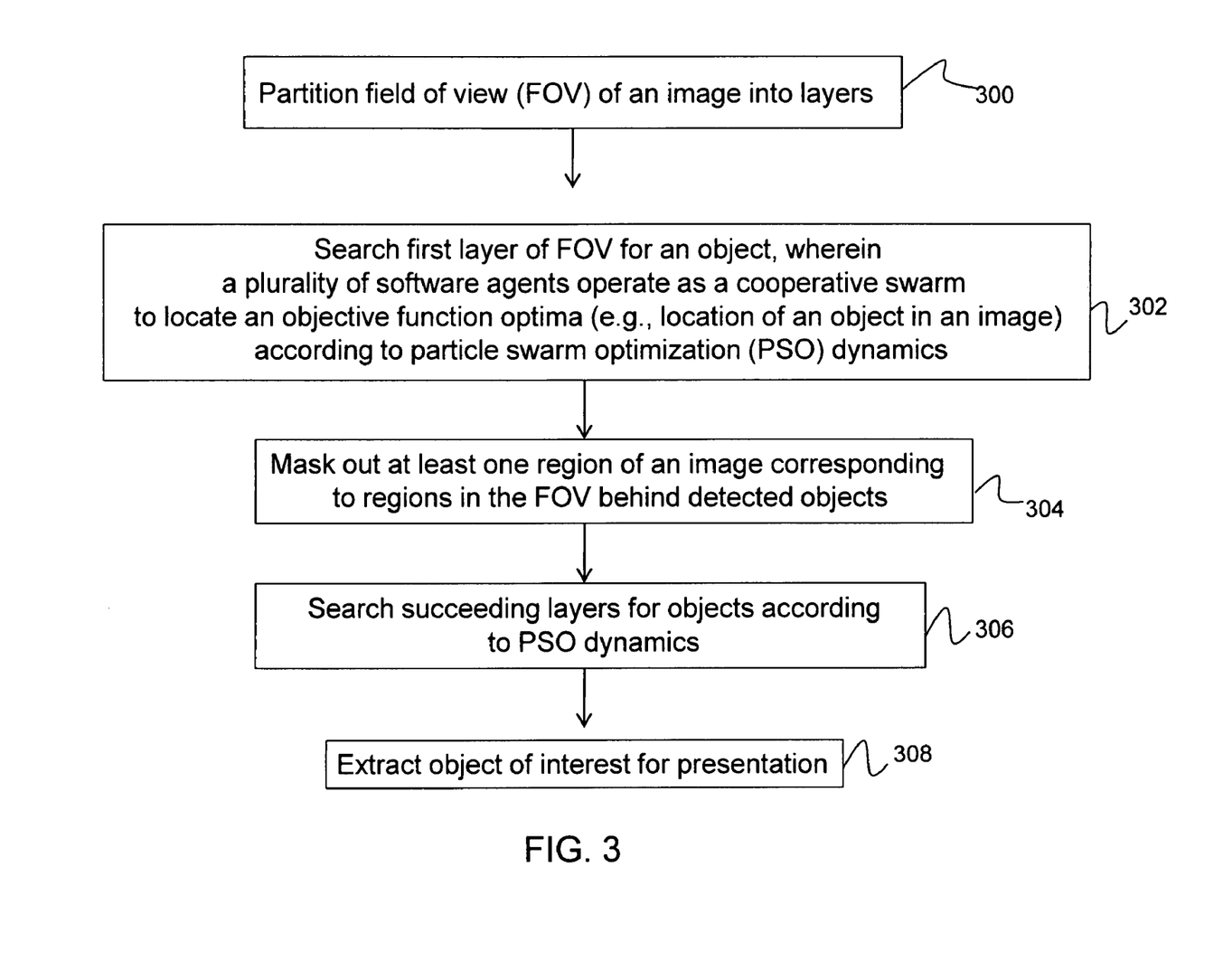
FIG. 3 is a flow diagram illustrating multi-layered object detection utilizing particle swarm optimization according to the present invention.

FIG. 3 illustrates a system for multi-layered object detection utilizing particle swarm optimization. As described in detail above, in a first step 300, a field-of-view (FOV) of an image is first partitioned into several layers. In a second step 302, the first layer of the partitioned FOV is searched for an object using a layer-specific classifier cascade and a plurality of software agents that operate as a cooperative swarm to locate an objective function optima (e.g., location of an object in an image) according to particle swarm optimization (PSO)

dynamics. The stages in the classifier cascade are progressively utilized throughout the layers in the FOV. As a non-limiting example, only the first two stages of the cascade may be used for detecting objects in the closest layer in the FOV, the first four stages for detecting objects in a middle layer, and the entire cascade for the farthest layer. In a third step 304, at least one region of the image corresponding to regions in the FOV behind detected objects is masked out. Finally, in a fourth step 306, succeeding layers for objects are searched according to PSO dynamics, wherein a plurality of software agents is distributed in unmasked regions of the FOV. Finally, an object of interest is extracted from the image 308 for presentation to a user.

Figure 4:
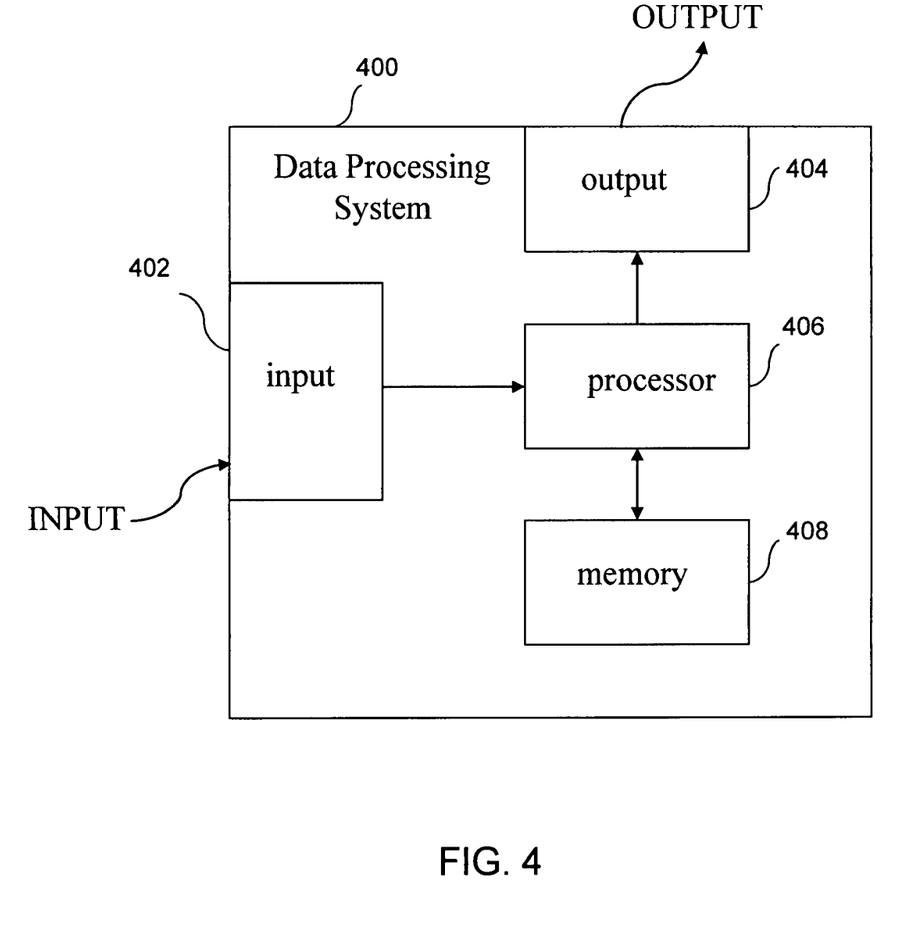
FIG. 4 is an illustration of a data processing system according to the present invention.

FIG. 4 illustrates a block diagram depicting components of a data processing system 400 (e.g., computer) incorporating the operations of the method described above. The method utilizes a data processing system 400 for storing computer executable instruction means for causing a processor (or processors) to carry out the operations of the above described method. The data processing system 400 comprises an input 402 for receiving information from a user. Information received may include input from devices such as cameras, scanners, keypads, keyboards, microphone, other peripherals such as storage devices, other programs, etc. The input 402 may include multiple "ports." An output 404 is connected with a processor 406 for providing information for transmission to other data processing systems, to storage devices, to display devices such as monitors, to generating information necessary for delivery, and to other mechanisms for presentation in user-usable forms. The input 402 and the output 404 are both coupled with the processor 406 (or processors), which may be a general-purpose computer processor or a specialized processor designed specifically for use with the present invention. The processor 406 is coupled with a memory 408 to permit storage of data and software to be manipulated by commands to the processor 406.

Figure 5:
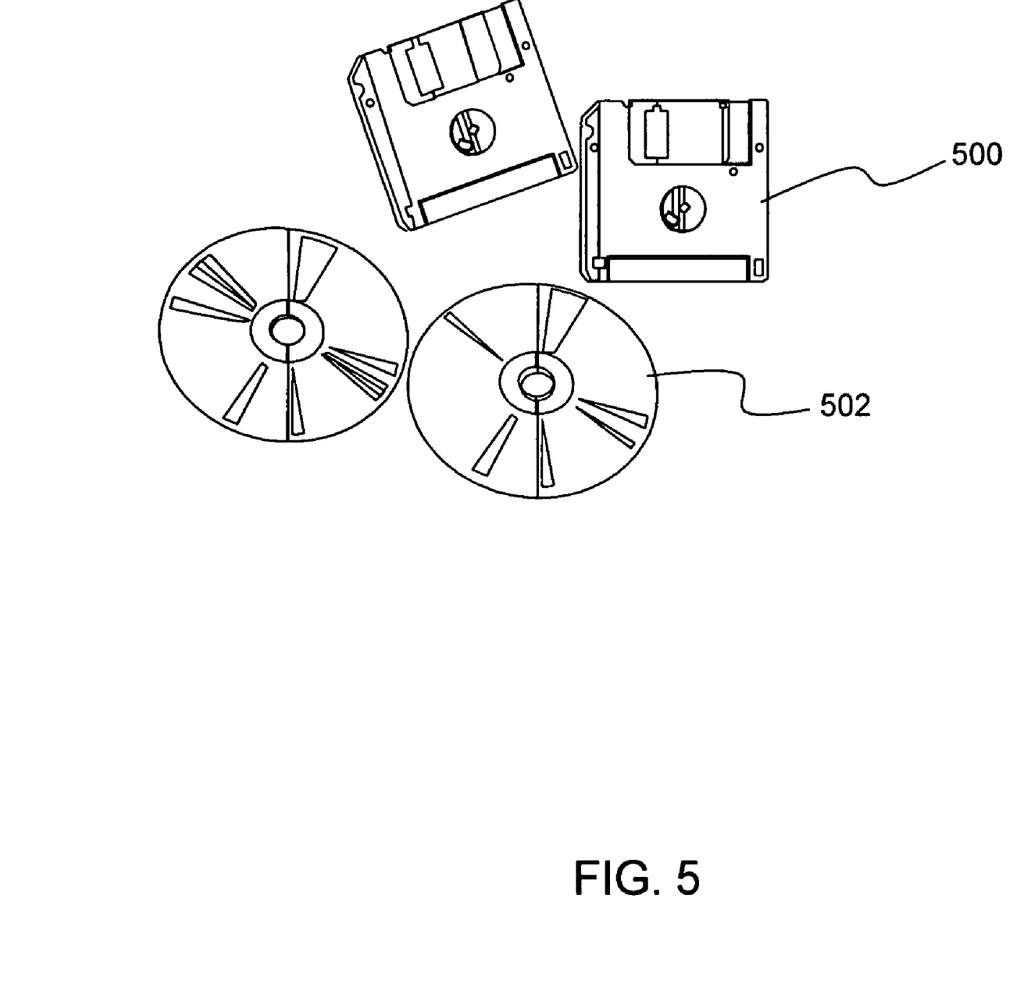
FIG. 5 is an illustration of a computer program product according to the present invention.

An illustrative diagram of a computer program product embodying the present invention is depicted in FIG. 5. As a non-limiting example, the computer program product is depicted as either a floppy disk 500 or an optical disk 502. However, as mentioned previously, the computer program product generally represents instruction means (i.e., computer readable code) stored on any compatible computer readable medium.

(3) Conclusion

The present invention is well suited for real-time applications that involve camera motion and where objects closest to the camera need to be detected rapidly so that any collisions can be avoided. This is achieved by using the fewest particles and classifier cascade stages. Furthermore, the present invention can be used to improve performance and add capabilities to a wide variety of automotive safety (e.g., backup warning, pre-crash sensing), factory automation, surveillance, force protection, and automatic target recognition.

What is claimed is:

1. A system for multi-layered object detection, the system comprising one or more processors configured to perform operations of:

partitioning a field-of-view of an image captured by a sensor into a plurality of layers;

operating a plurality of software agents as a cooperative swarm to sequentially search each of the plurality of layers to locate an objective function optima according to particle swarm optimization dynamics, wherein the objective function corresponds to a location of an object of interest in each layer being searched;

extracting an object of interest from at least one layer for presentation to a user; and, wherein the system is further configured to perform operations of:

searching a first layer for the objective function optima corresponding to the location of an object of interest, the first layer being the layer closest to the sensor;

masking a region of the image upon detection of an object of interest in the first layer resulting in at least one masked region and at least one unmasked region, wherein the at least one masked region corresponds to a region in the field-of-view of the image behind the object of interest; and searching succeeding layers of the field-of-view for an object of interest until the entire field-of-view has been searched for at least one object of interest, wherein the plurality of software agents are distributed in at least one unmasked region of the field-of-view.

2. The system for multi-layered object detection as set forth in claim 1, wherein the system is further configured to perform operations of employing a cascade of classifiers at each layer of the field-of-view for object detection, wherein the cascade of classifiers comprises a plurality of classifier stages, and wherein each software agent implements a cascade which classifies a local region in each layer.

3. The system for multi-layered object detection as set forth in claim 2, wherein the cascade of classifiers is employed in a layer-specific manner, such that a distinct set of classifier stages is used for each layer.

4. The system for multi-layered object detection as set forth in claim 3, wherein the system is further configured to perform operations of selecting a plurality of software agents and selecting a set of parameters for each layer of the field-of-view, wherein each layer provides a context for the selection of the software agents and set of parameters.

5. A system for multi-layered object detection, the system comprising one or more processors configured to perform operations of:

partitioning a field-of-view of an image captured by a sensor into a plurality of layers;

operating a plurality of software agents as a cooperative swarm to sequentially search each of the plurality of layers to locate an objective function optima according to particle swarm optimization dynamics, wherein the objective function corresponds to a location of an object of interest in each layer being searched;

extracting an object of interest from at least one layer for presentation to a user; and generating an image pyramid of the image, wherein the plurality of layers correspond to a plurality of levels in the image pyramid, and wherein the image pyramid comprises a hierarchical structure having a plurality of levels representing distinct image resolutions of the image, wherein the plurality of levels comprise a coarsest level having a coarsest image resolution, a finest level having a finest image resolution, and at least one level between the coarsest level and the finest level;

wherein a swarm having relatively fewer software agents is used to search the coarsest level of the image pyramid first to locate at least one region which contains the object of interest; and wherein a swarm having a relatively greater number of software agents is used to search levels having increasing image resolutions along the image pyramid in order to locate the object of interest.

6. A computer-implemented method for multi-layered object detection, the method comprising an act of causing a processor to perform operations of:
- partitioning a field-of-view of an image captured by a sensor into a plurality of layers;
- operating a plurality of software agents as a cooperative swarm to sequentially search each of the plurality of layers to locate an objective function optima according to particle swarm optimization dynamics, wherein the objective function corresponds to a location of an object of interest in the layer being searched;
- extracting an object of interest from at least one layer for presentation to a user;
- searching a first layer for the objective function optima corresponding to the location of an object of interest, the first layer being the layer closest to the sensor;
- masking a region of the image upon detection of an object of interest in the first layer resulting in at least one masked region and at least one unmasked region, wherein the at least one masked region corresponds to a region in the field-of-view of the image behind the object of interest; and
- searching succeeding layers of the field-of-view for an object of interest until the entire field-of-view has been searched for at least one object of interest, wherein the plurality of software agents are distributed in at least one unmasked region of the field-of-view.

7. The method for multi-layered object detection as set forth in claim 6, further comprising acts of employing a cascade of classifiers at each layer of the field-of-view for object detection, wherein the cascade of classifiers comprises a plurality of classifier stages, and wherein each software agent implements a cascade which classifies a local region in each layer.

8. The method for multi-layered object detection as set forth in claim 7, wherein the cascade of classifiers is employed in a layer-specific manner, such that a distinct set of classifier stages is used for each layer.

9. The method for multi-layered object detection as set forth in claim 8, wherein the method further comprises an act of selecting a plurality of software agents and selecting a set of parameters for each layer of the field-of-view, wherein each layer provides a context for the selection of the software agents and set of parameters.

10. A computer-implemented method for multi-layered object detection, the method comprising an act of causing a processor to perform operations of:
- partitioning a field-of-view of an image captured by a sensor into a plurality of layers;
- operating a plurality of software agents as a cooperative swarm to sequentially search each of the plurality of layers to locate an objective function optima according to particle swarm optimization dynamics, wherein the objective function corresponds to a location of an object of interest in the layer being searched;
- extracting an object of interest from at least one layer for presentation to a user;
- generating an image pyramid of the image, wherein the plurality of layers correspond to a plurality of levels in the image pyramid, and wherein the image pyramid comprises a hierarchical structure having a plurality of levels representing distinct image resolutions of the image, wherein the plurality of levels comprise a coarsest level having a coarsest image resolution, a finest level having a finest image resolution, and at least one level between the coarsest level and the finest level;
- wherein a swarm having relatively fewer software agents is used to search the coarsest level of the image pyramid first to locate at least one region which contains the object of interest; and
- wherein a swarm having a relatively greater number of software agents is used to search levels having increasing image resolutions along the image pyramid in order to locate the object of interest.

11. A computer program product for multi-layered object detection, the computer program product comprising computer-readable instruction means stored on a non-transitory computer-readable medium that are executable by a computer having a processor for causing the processor to perform operations of:
- partitioning a field-of-view of an image captured by a sensor into a plurality of layers;
- operating a plurality of software agents as a cooperative swarm to sequentially search each of the plurality of layers to locate an objective function optima according to particle swarm optimization dynamics, wherein the objective function corresponds to a location of an object of interest in the layer being searched;
- extracting an object of interest from at least one layer for presentation to a user;
- searching a first layer for the objective function optima corresponding to the location of an object of interest, the first layer being the layer closest to the sensor;
- masking a region of the image upon detection of an object of interest in the first layer resulting in at least one masked region and at least one unmasked region, wherein the at least one masked region corresponds to a region in the field-of-view of the image behind the object of interest; and
- searching succeeding layers of the field-of-view for an object of interest until the entire field-of-view has been searched for at least one object of interest, wherein the plurality of software agents are distributed in at least one unmasked region of the field-of-view.

12. The computer program product for multi-layered object detection as set forth in claim 11, wherein the computer program product further comprises instruction means for causing the processor to perform operations of employing a cascade of classifiers at each layer of the field-of-view for object detection, wherein the cascade of classifiers comprises a plurality of classifier stages, and wherein each software agent implements a cascade which classifies a local region in each layer.

13. The computer program product for multi-layered object detection as set forth in claim 12, wherein the cascade of classifiers is employed in a layer-specific manner, such that a distinct set of classifier stages is used for each layer.

14. The computer program product for multi-layered object detection as set forth in claim 13, wherein the computer program product further comprises instruction means for causing the processor to perform operations of selecting a plurality of software agents and selecting a set of parameters for each layer of the field-of-view, wherein each layer provides a context for the selection of the software agents and set of parameters.

15. A computer program product for multi-layered object detection, the computer program product comprising computer-readable instruction means stored on a computer-readable medium that are executable by a computer having a processor for causing the processor to perform operations of:
- partitioning a field-of-view of an image captured by a sensor into a plurality of layers;

operating a plurality of software agents as a cooperative swarm to sequentially search each of the plurality of layers to locate an objective function optima according to particle swarm optimization dynamics, wherein the objective function corresponds to a location of an object of interest in the layer being searched;

extracting an object of interest from at least one layer for presentation to a user;

generating an image pyramid of the image, wherein the plurality of layers correspond to a plurality of levels in the image pyramid, and wherein the image pyramid comprises a hierarchical structure having a plurality of levels representing distinct image resolutions of the image, wherein the plurality of levels comprise a coarsest level having a coarsest image resolution, a finest level having a finest image resolution, and at least one level between the coarsest level and the finest level;

wherein a swarm having relatively fewer software agents is used to search the coarsest level of the image pyramid first to locate at least one region which contains the object of interest; and wherein a swarm having a relatively greater number of software agents is used to search levels having increasing image resolutions along the image pyramid in order to locate the object of interest.

* * * * *